United States Patent
Sugihira et al.

(10) Patent No.: US 10,273,898 B2
(45) Date of Patent: Apr. 30, 2019

(54) CONTROLLER FOR INTERNAL COMBUSTION ENGINE

(71) Applicant: TOYOTA JIDOSHA KABUSHIKI KAISHA, Toyoto-shi, Aichi-ken (JP)

(72) Inventors: Shigehiro Sugihira, Susono (JP); Naoto Kato, Gotenba (JP); Satoshi Yoshizaki, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/534,696

(22) PCT Filed: Dec. 10, 2015

(86) PCT No.: PCT/IB2015/002320
§ 371 (c)(1),
(2) Date: Jun. 9, 2017

(87) PCT Pub. No.: WO2016/092360
PCT Pub. Date: Jun. 16, 2016

(65) Prior Publication Data
US 2017/0342926 A1    Nov. 30, 2017

(30) Foreign Application Priority Data

Dec. 12, 2014  (JP) .................... 2014-252146

(51) Int. Cl.
*F02D 41/14*   (2006.01)
*F02D 41/10*   (2006.01)
(Continued)

(52) U.S. Cl.
CPC ........ *F02D 41/1475* (2013.01); *F02D 11/105* (2013.01); *F02D 41/0007* (2013.01);
(Continued)

(58) Field of Classification Search
CPC ............ F02D 2250/21; F02D 2250/26; F02D 2250/28; F02D 2250/36
See application file for complete search history.

(56) References Cited

U.S. PATENT DOCUMENTS 4,873,961 A * 10/1989 Tanaka ................. F02B 33/443
                                                    123/564
5,996,547 A   12/1999 Machida et al.
(Continued)

FOREIGN PATENT DOCUMENTS

DE    102007000088 A1   8/2007
JP    H08-177569 A      7/1996
(Continued)

OTHER PUBLICATIONS

United States Patent and Trademark Office, Office Action issued to U.S. Appl. No. 15/537,995 dated Apr. 27, 2018, 10 pages.
(Continued)

*Primary Examiner* — Sizo Vilakazi
*Assistant Examiner* — Kevin R Steckbauer
(74) *Attorney, Agent, or Firm* — Hunton Andrews Kurth LLP

(57) ABSTRACT

A controller for an internal combustion engine includes an electronic control unit. The electronic control unit is configured to increase an air amount that is suctioned into a cylinder while maintaining the lean air-fuel ratio as a first torque increasing operation in a case where target torque is increased during the operation at the lean air-fuel ratio such that torque is increased. The electronic control unit is configured to compute limit torque as an upper limit of the torque that can be realized in a case where the lean air-fuel ratio is kept for a certain time from a current time point. The electronic control unit is configured to switch to the operation at the theoretical air-fuel ratio and increase the torque as a second torque increasing operation in a case where the
(Continued)

target torque becomes higher than the limit torque during execution of the first torque increasing operation.

4 Claims, 12 Drawing Sheets

(51) Int. Cl.
  *F02D 11/10* (2006.01)
  *F02D 41/00* (2006.01)
  *F02D 41/30* (2006.01)

(52) U.S. Cl.
  CPC .......... *F02D 41/10* (2013.01); *F02D 41/3076* (2013.01); *F02D 2041/1412* (2013.01); *F02D 2250/18* (2013.01); *F02D 2250/21* (2013.01); *F02D 2250/22* (2013.01); *F02D 2250/26* (2013.01); *Y02T 10/144* (2013.01)

(56) References Cited

U.S. PATENT DOCUMENTS

| | | | | |
|---|---|---|---|---|
| 6,758,185 | B2* | 7/2004 | Surnilla | F01N 3/0814 123/198 DB |
| 6,971,367 | B2* | 12/2005 | Satou | F02D 11/105 123/350 |
| 7,047,932 | B2* | 5/2006 | Surnilla | F01N 3/0814 123/198 F |
| 7,194,987 | B2* | 3/2007 | Mogi | F02D 15/04 123/48 C |
| 7,234,436 | B2* | 6/2007 | Surnilla | F01N 3/0814 123/198 DB |
| 8,464,687 | B2* | 6/2013 | Kakuya | F02D 41/3035 123/305 |
| 9,175,615 | B2* | 11/2015 | Badillo | F02D 19/08 |
| 9,382,865 | B2* | 7/2016 | Genslak | F02D 41/222 |
| 9,581,094 | B2* | 2/2017 | Saito | F02D 41/307 |
| 9,644,549 | B2* | 5/2017 | Saito | F02D 41/1475 |
| 9,644,550 | B2* | 5/2017 | Nagai | F02D 41/0007 |
| 9,879,624 | B2* | 1/2018 | Tanaka | F02D 41/12 |
| 2002/0107107 | A1 | 8/2002 | Ogawa et al. | |
| 2003/0221655 | A1* | 12/2003 | Surnilla | F01N 3/0814 123/198 F |
| 2004/0134464 | A1* | 7/2004 | Mogi | F02D 15/04 123/406.12 |
| 2004/0206072 | A1* | 10/2004 | Surnilla | F01N 3/0814 60/285 |
| 2006/0154784 | A1* | 7/2006 | Surnilla | F01N 3/0814 477/111 |
| 2012/0055445 | A1* | 3/2012 | Kakuya | F02D 41/3035 123/305 |
| 2012/0304639 | A1* | 12/2012 | Yonushonis | F01N 3/208 60/605.1 |
| 2014/0214306 | A1* | 7/2014 | Badillo | F02D 19/08 701/104 |
| 2015/0361906 | A1* | 12/2015 | Nagai | F02D 41/0007 123/568.11 |
| 2015/0377164 | A1* | 12/2015 | Kanno | F02D 29/02 290/40 R |
| 2016/0003175 | A1* | 1/2016 | Saito | F02D 41/1475 60/603 |
| 2016/0102603 | A1* | 4/2016 | Matsumoto | F02B 37/186 60/600 |
| 2016/0123252 | A1* | 5/2016 | Yoshizaki | F02D 41/107 123/436 |
| 2016/0123253 | A1* | 5/2016 | Saito | F02D 41/307 123/406.23 |
| 2016/0348606 | A1* | 12/2016 | Suzuki | F02D 41/3094 |
| 2016/0363070 | A1* | 12/2016 | Hotta | F02D 41/0235 |
| 2016/0363071 | A1* | 12/2016 | Matsumoto | F02B 37/183 |
| 2017/0021817 | A1* | 1/2017 | Kumazaki | B60K 6/445 |
| 2017/0350338 | A1* | 12/2017 | Sugihira | F02D 41/10 |
| 2018/0010534 | A1* | 1/2018 | Takeuchi | F02D 11/105 |

FOREIGN PATENT DOCUMENTS

| | | |
|---|---|---|
| JP | H11-22512 A | 1/1999 |
| JP | 2000-052817 A | 2/2000 |
| JP | 2000-213390 A | 8/2000 |
| JP | 2002-235579 A | 8/2002 |
| JP | 2004-169709 A | 6/2004 |
| JP | 2004-218432 A | 8/2004 |
| JP | 2005-155428 A | 6/2005 |
| JP | 2007218143 A | 8/2007 |
| JP | 2014-163317 A | 9/2014 |
| JP | 2014163317 A * | 9/2014 .......... Y02T 10/144 |

OTHER PUBLICATIONS

United States Patent and Trademark Office, Notice of Allowance issued to U.S. Appl. No. 15/537,995 dated Sep. 21, 2018, 12 pages.

* cited by examiner

CONTROLLER FOR INTERNAL COMBUSTION ENGINE

CROSS-REFERENCE TO RELATED APPLICATIONS

This is a national phase application based on the PCT International Patent Application No. PCT/IB2015/002320 filed Dec. 10, 2015, claiming priority to Japanese Patent Application No. 2014-252146 filed Dec. 12, 2014, the entire contents of both of which are incorporated herein by reference.

BACKGROUND OF THE INVENTION

1. Field of the Invention

The invention relates to a controller for an internal combustion engine including a turbocharger, and in particular to a controller for an internal combustion engine capable of selecting an operation at a theoretical air-fuel ratio and an operation at a specified lean air-fuel ratio that is leaner than the theoretical air-fuel ratio.

2. Description of Related Art

As disclosed in Japanese Patent Application Publication No. 2000-052817 (JP 2000-052817 A), as a control method for an internal combustion engine capable of performing an operation at a lean air-fuel ratio (hereinafter referred to as a lean operation), a control method, in which a target torque computed from an accelerator pedal operation amount and the like is compared to a specified determination value, the lean operation is selected when the target torque is at most equal to the determination ratio, and an operation at a theoretical air-fuel ratio (hereinafter referred to as a stoichiometric operation) is selected when the target torque is higher than the determination ratio, has been known. In addition, as disclosed in Japanese Patent Application Publication No. 11-022512 (JP 11-022512 A), a control method, in which the operation is switched from the lean operation to the stoichiometric operation when a difference corresponding to a specified value or larger is generated between the target torque and actual torque during the lean operation, has also been known. Furthermore, a control method, in which the operation is promptly switched from the lean operation to the stoichiometric operation when an acceleration request by a driver is detected during the lean operation, has also publicly been known.

SUMMARY OF THE INVENTION

By the way, a turbo lag is generated during acceleration in the internal combustion engine that includes the turbocharger. In particular, the turbo lag becomes further significant during the lean operation because of less energy in exhaust gas. In order to satisfy the acceleration request by the driver, instead of continuing the lean operation, switching to the stoichiometric operation, in which the higher exhaust energy can be obtained and responsiveness of turbocharging pressure with respect to an operation of an actuator is high, is demanded.

The target torque and the determination value are compared to make the above switching. In such a case, if the actual torque remains low, the switching to the stoichiometric operation is not made until the target torque exceeds the determination value. For this reason, a sense of acceleration requested by the driver cannot be provided, which promotes further depression of the accelerator pedal by the driver. As a result, fuel economy possibly worsens.

In addition, in a case where the above switching is determined by a difference between the target torque and the actual torque, the switching to the stoichiometric operation is uniformly made even in such a situation that the actual torque reaches the target torque within a short time. Accordingly, an opportunity for performing the lean operation is lost. As a result, the fuel economy possibly worsens. The same applies to the control method, in which the operation is promptly switched to the stoichiometric operation when the acceleration request by the driver is detected. Depending on a magnitude of the acceleration request, the lean operation can be continued. Thus, if the switching to the stoichiometric operation is simply made, an opportunity for improving the fuel economy by performing the lean operation is lost.

As described above, there is room for improvement in a conventionally suggested technique related to switching from the lean operation to the stoichiometric operation, in terms of balance between satisfying the acceleration request by the driver and improving the fuel economy.

The invention provides a controller for an internal combustion engine that includes a turbocharger and can select a stoichiometric operation and a lean operation, the controller for an internal combustion engine capable of extending a period in which the lean operation is executed while satisfying an acceleration request by a driver.

A controller for an internal combustion engine according to one aspect of the invention is provided. The internal combustion engine includes a turbocharger. The internal combustion engine is configured to selectively switch between an operation at a theoretical air-fuel ratio and an operation at a specified lean air-fuel ratio that is leaner than the theoretical air-fuel ratio. The controller includes an electronic control unit. The electronic control unit is configured to increase an air amount that is suctioned into a cylinder of the internal combustion engine while maintaining the lean air-fuel ratio as a first torque increasing operation in a case where target torque is increased during the operation at the lean air-fuel ratio such that torque of the internal combustion engine is increased. The electronic control unit is configured to compute limit torque as an upper limit of the torque that can be realized in a case where the lean air-fuel ratio is kept for a certain time from a current time point. The electronic control unit is configured to switch to the operation at the theoretical air-fuel ratio and increase the torque of the internal combustion engine as a second torque increasing operation in a case where the target torque becomes higher than the limit torque during execution of the first torque increasing operation.

The limit torque is the upper limit of the torque that can be realized even by the operation at the lean air-fuel ratio after the certain time. Accordingly, when the limit torque is higher than the target torque, the target torque can be realized within the certain time while the lean air-fuel ratio is maintained. On the contrary, in a case where the target torque is higher than the limit torque and the lean air-fuel ratio is maintained, the target torque cannot be realized within the certain time. As described above, the controller for an internal combustion engine according to the above aspect switches the operation from the first torque increasing operation to the second torque increasing operation in a case where the target torque becomes higher than the limit torque and thus the target torque cannot be realized even after the certain time. The "certain time" is set as a window time until realization of the target torque with which an acceleration request by a driver can be satisfied. In this way, a period in which the operation at the lean air-fuel ratio is executed while the acceleration request by the driver is satisfied, can be extended as long as possible.

In the above aspect, in a case where the internal combustion engine includes a throttle and a waste gate valve, it is preferred to compute, as the limit torque, torque that is realized after the certain time in a case where the throttle is fully opened and the waste gate valve is fully closed at the current time point. The limit torque that is computed under such a definition is the torque that is realized after the certain time in a case where the torque is increased at a fastest speed at the lean air-fuel ratio by operations of the throttle and the waste gate valve.

In the above aspect, it is preferred that a length of the "certain time" can be changed in accordance with an operation mode selected by the driver. For example, when an operation mode, in which fuel economy performance is requested, is selected, the length of the certain time is set to be extended. In this way, the operation at the lean air-fuel ratio can be continued for a longer period by delaying switching timing from the first torque increasing operation to the second torque increasing operation. Meanwhile, for example, when an operation mode, in which acceleration performance is requested, is selected, the length of the certain time is set to be shortened. In this way, the switching timing from the first torque increasing operation to the second torque increasing operation is advanced, and thereby responsiveness of the torque can be improved by the operation at the theoretical air-fuel ratio.

Due to the execution of the second torque increasing operation, the turbocharging pressure is increased by the operation at the theoretical air-fuel ratio, in which higher exhaust energy than that during the operation at the lean air-fuel ratio can be obtained. When the turbocharging pressure is increased, the limit torque is also. increased by corresponding thereto. Accordingly, the limit torque possibly becomes higher than the target torque again during the operation at the theoretical air-fuel ratio. In this case, the operation at the theoretical air-fuel ratio is preferably switched to the operation at the lean air-fuel ratio. This is because the fuel economy performance can be improved by the switching to the lean air-fuel ratio.

However, in a case where the operation at the theoretical air-fuel ratio is switched to the operation at the lean air-fuel ratio, the limit torque temporarily becomes lower than the target torque due to a decrease in the turbocharging pressure. Even when the operation is switched to the operation at the theoretical air-fuel ratio again in order to handle the above, the limit torque is increased by an increase in the turbocharging pressure. Thus, the operation is switched to the operation at the lean air-fuel ratio again. As a result, repeated switching between the operation at the theoretical air-fuel ratio and the operation at the lean air-fuel ratio, that is, hunting is generated. Accordingly, in a case where the operation at the theoretical air-fuel ratio is switched to the operation at the lean air-fuel ratio when the limit torque becomes higher than the target torque again during the operation at the theoretical air-fuel ratio, it is preferred to maintain the operation at the lean air-fuel ratio at least for a specified period after the switching to the operation at the lean air-fuel ratio. The period in which the operation at the lean air-fuel ratio is maintained is preferably a period until the turbocharging pressure, which is decreased due to the switching to the operation at the lean air-fuel ratio, is increased again.

According to the controller for an internal combustion engine according to the invention, in a case where the target torque is increased during the operation at the lean air-fuel ratio and the target torque is at most equal to the limit torque, the execution of the first torque increasing operation is continued. Then, when the target torque becomes higher than the limit torque, the operation is switched to the second torque increasing operation. In this way, the period in which the operation at the lean air-fuel ratio is executed can be extended while the acceleration request by the driver is satisfied.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on embodiments of the invention with reference to the drawings. It should be noted that, in the case where a numerical value of the number, a volume, an amount, a range, or the like of each component is mentioned in the following embodiments, the invention is not limited to the mentioned numerical value except for a case where such a numerical value is particularly defined and a case where the component is obviously limited to such a numerical value in principle. In addition, a structure, a step, and the like that will be described in the following embodiments are not necessarily essential to the invention except for a case where such a structure, a step, and the like are particularly defined and a case where the invention is obviously limited to have such a structure, a step, and the like in principle.

Figure 1:
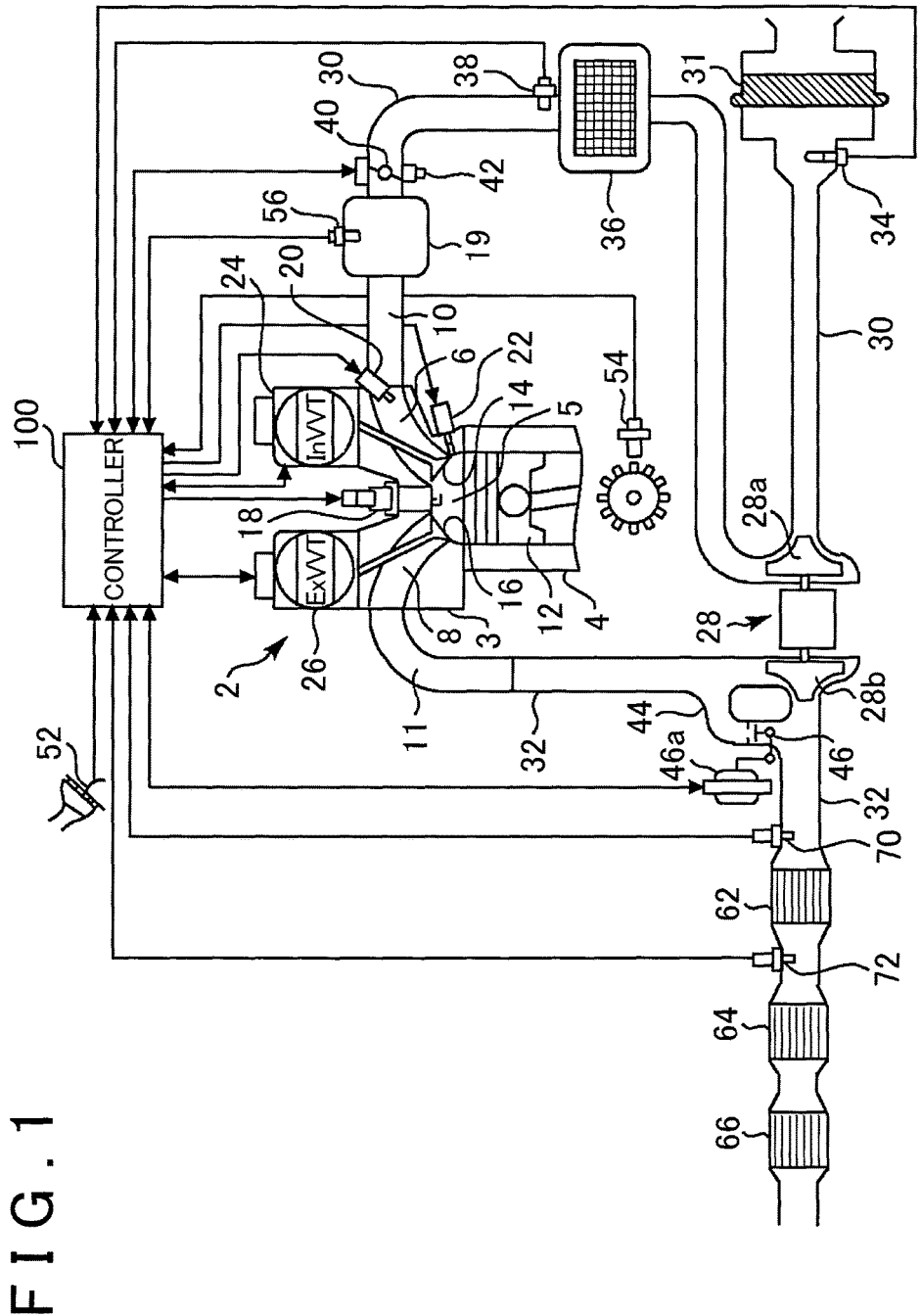
FIG. 1 is a view of a configuration of an engine system in Embodiment 1 of the invention.

Embodiment 1 1. Configuration of an engine system FIG. 1 is a view of a configuration of an engine system in Embodiment 1 of the invention. The engine system of this embodiment includes an internal combustion engine (hereinafter referred to as an engine) 2 with a turbocharger that is mounted as a power unit in an automobile. This engine 2 is a lean-burn engine that can select a stoichiometric operation (that is, an operation at a theoretical air-fuel ratio) and a lean operation (that is, an operation at a specified lean air-fuel ratio that is leaner than the theoretical air-fuel ratio). An air-fuel ratio during the lean operation is set to fall within a leaner air-fuel ratio range than an air-fuel ratio range in which a significant amount of NOx is produced, and is set such that a value thereof falls within an air-fuel ratio range from 24 to 26, for example.

The engine 2 includes a cylinder block 4, in which a piston 12 is arranged, and a cylinder head 3. The number of cylinders and arrangement of the cylinders in the engine 2 are not particularly limited. A space held between the cylinder head 3 and the piston 12 serves as a combustion chamber 5. The engine 2 is an engine of a spark ignition type, and an ignition plug 18 of an igniter is attached to the cylinder head 3 in a manner to be projected to a top of the combustion chamber 5.

An intake port 6 and an exhaust port 8 are each opened to the combustion chamber 5. A communication state between the combustion chamber 5 and the intake port 6 is controlled by an intake valve 14 that is provided in the cylinder head 3. A communication state between the combustion chamber 5 and the exhaust port 8 is controlled by an exhaust valve 16 that is provided in the cylinder head 3. A variable intake valve train 24 that makes an opening characteristic of the intake valve 14 variable is provided in the intake valve 14. A variable exhaust valve train 26 that makes an opening characteristic of the exhaust valve 16 variable is provided in the exhaust valve 16.

This engine 2 includes two fuel injection valves for the each cylinder. One is an in-cylinder injection valve 22 that directly injects fuel into the combustion chamber 5. The other is a port injection valve 20 that injects the fuel into the intake port 6.

An intake manifold 10 with which a surge tank 19 is integrated is connected to the intake port 6. An intake passage 30 that suctions air from the outside is connected to the surge tank 19. An electronically-controlled throttle 40 is provided in the vicinity of the surge tank 19 in the intake passage 30. An air cleaner 31 is provided at a tip of the intake passage 30.

An exhaust manifold 11 is connected to the exhaust port 8. An exhaust passage 32 that discharges exhaust gas to the outside is connected to the exhaust manifold 11. A three-way catalyst 62, a NOx occlusion reduction type catalyst 64, and a selective reduction type catalyst 66 are sequentially provided from an upstream side in the exhaust passage 32.

The engine 2 has a turbocharger 28. A compressor 28a of the turbocharger 28 is provided on an upstream side of the throttle 40 in the intake passage 30. An intercooler 36 for cooling the intake air that is compressed by the compressor 28a is provided between the compressor 28a and the throttle 40 in the intake passage 30. A turbine 28b of the turbocharger 28 is provided on an upstream side of the three-way catalyst 62 in the exhaust passage 32. A bypass passage 44 that bypasses between an upstream side and a downstream side of the turbine 28b is provided in the vicinity of the turbine 28b. A waste gate valve 46 is installed in the bypass passage 44. When the waste gate valve 46 is opened, some of the exhaust gas bypasses the turbine 28b and flows through the bypass passage 44. The waste gate valve 46 is driven by a negative pressure actuator 46a of a diaphragm type.

The system of this embodiment includes sensors for obtaining information on an operation state of the engine 2 at various locations. An airflow meter 34 for measuring an intake air amount is installed on a directly downstream side of the air cleaner 31 in the intake passage 30. A pressure sensor 38 for measuring turbocharging pressure is installed in a directly downstream side of the intercooler 36 in the intake passage 30. A throttle position sensor 42 for measuring an opening degree of the throttle 40 is installed in the vicinity of the throttle 40. A pressure sensor 56 for measuring intake manifold pressure is installed in the surge tank 19. In this specification, pressure on the upstream side of the throttle 40 is referred to as the turbocharging pressure, and pressure on the downstream side of the throttle 40 is referred to as the intake manifold pressure.

An air-fuel ratio sensor 70 for outputting a signal that varies linearly with respect to an air-fuel ratio before combustion of the exhaust gas is installed on a directly upstream side of the three-way catalyst 62 in the exhaust passage 32. In addition, an oxygen sensor 72 for outputting a signal is installed on a directly downstream side of the three-way catalyst 62 in the exhaust passage 32, and the signal varies in a stepwise manner on an oxygen excess side and an oxygen shortage side with concentration of oxygen in the exhaust gas, which is obtained by combustion of air-fuel mixture at the theoretical air-fuel ratio, being a boundary.

Furthermore, the system of this embodiment has: an accelerator position sensor 52 for measuring an operation amount of an accelerator pedal; and a crank angle sensor 54 for measuring a crank angle of the engine 2.

The above-described various sensors and actuators are electrically connected to a controller 100. The controller 100 is an electronically controlled unit (ECU). The controller 100 executes control of the entire system of the engine 2 and is constructed of a computer that includes a CPU, a ROM, and a RAM, as a main component. The ROM stores routines of various types of control. When those routines are executed by the controller 100 and the actuators are operated on the basis of the signals from the sensors, the operation of the engine 2 is controlled.

Figure 2:
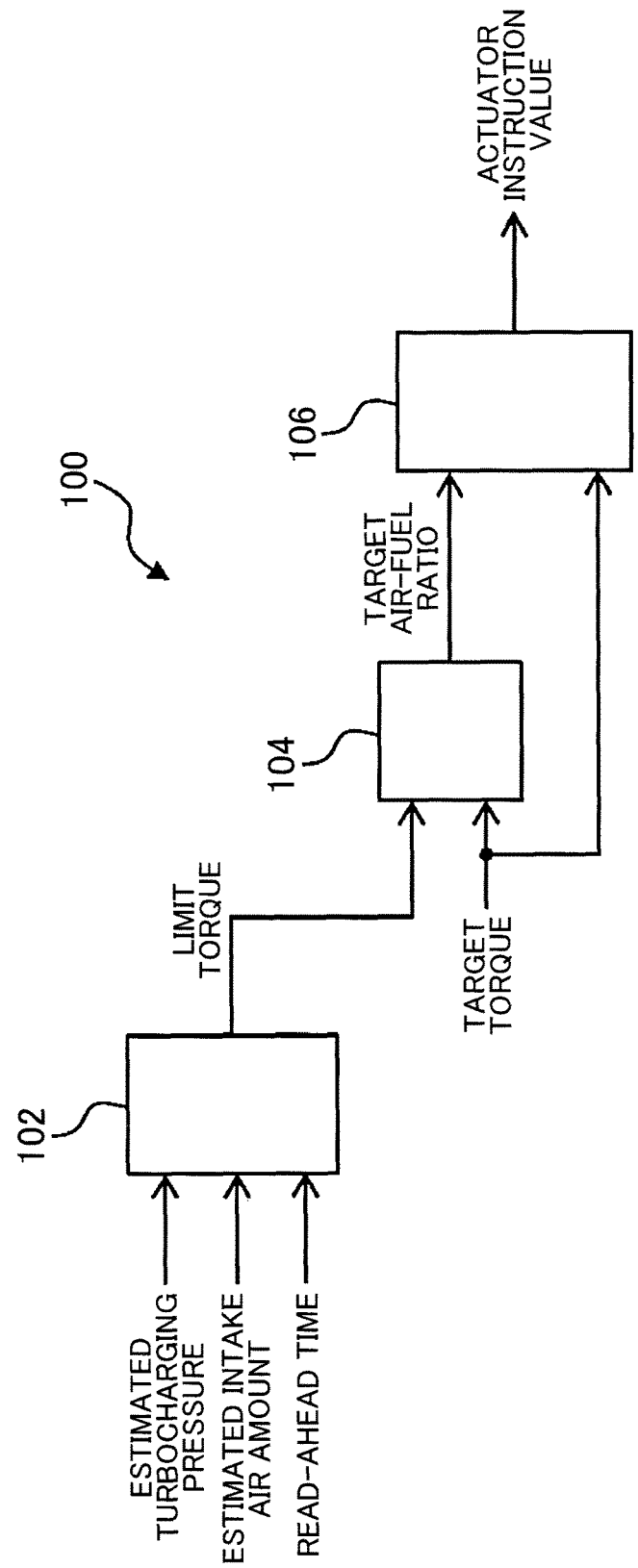
FIG. 2 is a block diagram of a configuration of a controller in Embodiment 1 of the invention.

2. Configuration of the controller FIG. 2 is a block diagram of a configuration of the controller 100 in Embodiment 1. The controller 100 includes a limit torque computation unit 102, a target air-fuel ratio setting unit 104, and an actuator operation amount computation unit 106. These computation units provided in the controller 100 correspond to a control program or a portion thereof that is stored in the ROM of the controller 100. Functions of these computation units are realized by the controller 100 when the control program is read out from the ROM and is executed by the CPU.

The function of the limit torque computation unit 102 will be described. Limit torque that is computed by the limit torque computation unit 102 refers to an upper limit value of torque that can be realized by a lean operation after a certain time from a current time point. More specifically, the limit torque is torque that is estimated to be realized at a lean air-fuel ratio after the certain time from the current time point in the case where the actuators for controlling an air amount is operated such that an in-cylinder intake air amount is increased at a maximum speed. More specifically, the actuators described herein refer to the throttle 40 and the waste gate valve 46. When the throttle 40 is fully opened and the waste gate valve 46 is fully closed, an increasing speed of the intake air amount becomes the maximum, and the intake air amount that is realized after the certain time from the current time point also becomes the maximum. It should be noted that, in the case where changes in valve timing and an operation angle by the variable intake valve train 24 are used for air amount control, the variable intake valve train 24, is also included in the actuator described herein.

A maximum intake air amount, which is realized by operations of the actuators for controlling the air amount including the throttle 40, the waste gate valve 46, and the like, is uniformly determined by the intake air amount and the turbocharging pressure at the current time point as well as a time from the current time point to a predicted time point at which the maximum intake air amount is realized (this is referred to as read-ahead time). In addition, in the case where the target air-fuel ratio during the lean operation is fixed, the torque is determined once the intake air amount is determined. Accordingly, when the intake air amount and the turbocharging pressure at the current time point as well as the read-ahead time are determined, the limit torque that can be realized after the certain time (this equals to the read-ahead time) from the current time point is also uniformly determined. The limit torque computation unit 102 searches for a map that is stored in the ROM of the controller 100, and determines the limit torque from an estimated intake air amount, estimated turbocharging pressure, and the read-ahead time. It should be noted that the estimated intake air amount used for a search for the map is an estimated value of a current intake air amount and is computed from a measurement value of a state amount that is related to the intake air amount, such as the intake manifold pressure and in-cylinder pressure. The estimated turbocharging pressure used for the search for the map is an estimated value of the current turbocharging pressure that is computed from the measurement value of the related state amount. However, instead of the estimated turbocharging pressure, an actual measurement value that is measured by the pressure sensor may be used.

The read-ahead time (a certain time) for determining the limit torque is a window time until realization of target torque with which the acceleration request by the driver can be satisfied. A permitted window time depends on a sense of the driver. Accordingly, the read-ahead time is determined in accordance with an operation mode of the engine 2 that is selected by the driver. For example, a sport mode and an economy mode are available as the operation mode, and those can be selected through an operation of a switch in a vehicle cabin. For example, when the sport mode is selected, the read-ahead time is set as a short time. Meanwhile, when the economy mode is selected, the read-ahead time is set as a long time.

A function of the target air-fuel ratio setting unit 104 will be described. The target air-fuel ratio setting unit 104 selects either one of the theoretical air-fuel ratio and the specified lean air-fuel ratio and sets the target air-fuel ratio at the selected air-fuel ratio. The target air-fuel ratio is selected on the basis of a comparison between the limit torque, which is computed by the limit torque computation unit 102, and the target torque. The target torque is determined from an accelerator pedal operation amount and an engine speed by referring to a torque map that is stored in the ROM of the controller 100. The limit torque is maximum torque that can be realized within the certain time at the lean air-fuel ratio. Accordingly, in the case where the target torque is at most equal to the limit torque, the target torque can be realized at the lean air-fuel ratio after the certain time at the latest. However, in the case where the target torque is higher than the limit torque, the target torque cannot be realized at the lean air-fuel ratio even after the certain time. A rule for setting the target air-fuel ratio in the target air-fuel ratio setting unit 104 is defined on the basis of such a relationship between the target torque and the limit torque.

Figure 3:
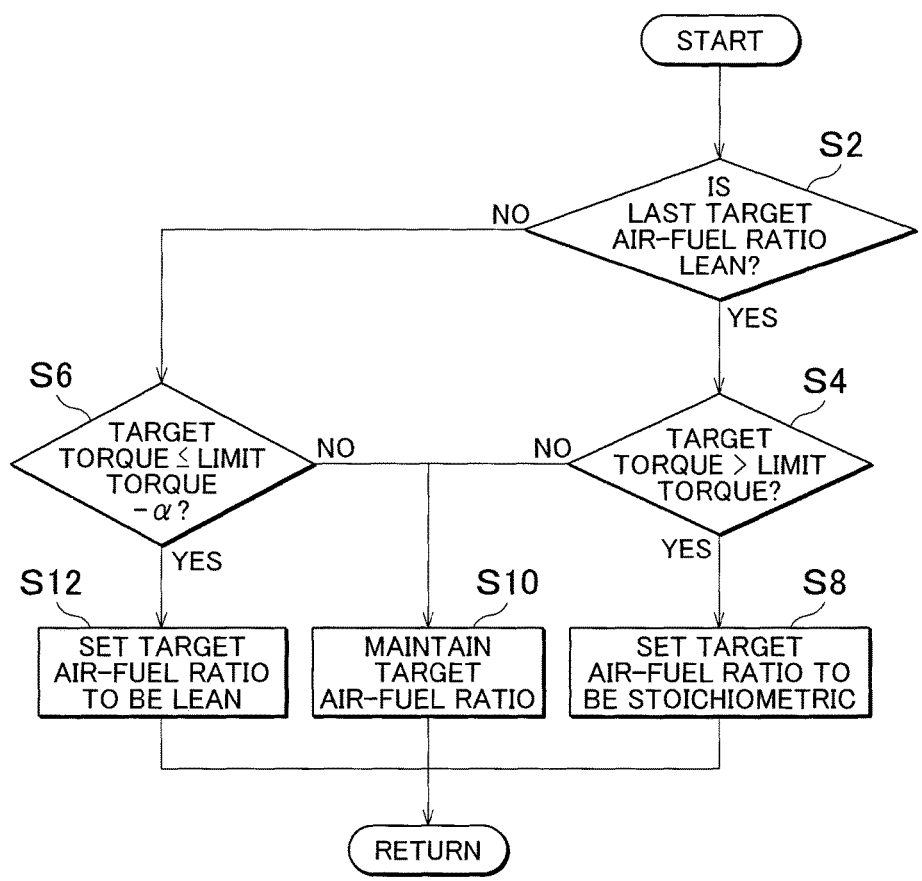
FIG. 3 is a flowchart of a rule for setting a target air-fuel ratio in Embodiment 1 of the invention.

FIG. 3 is a flowchart of the rule for setting the target air-fuel ratio in the target air-fuel ratio setting unit 104. The target air-fuel ratio setting unit 104 sets the target air-fuel ratio by following steps in this flowchart at every control cycle. First, it is determined in step S2 whether the target air-fuel ratio in the last control cycle is the lean air-fuel ratio. If the last target air-fuel ratio is the lean air-fuel ratio, that is, in the case where the lean operation has been executed so far, a determination in step S4 is made. If the last target air-fuel ratio is not the lean air-fuel ratio, that is, in the case where the stoichiometric operation has been executed so far, a determination in step S6 is made.

In step S4, the target torque and the limit torque are compared, and it is determined whether the target torque is higher than the limit torque. If the target torque is not higher than the limit torque, that is, if the target torque can be realized at the lean air-fuel ratio within the certain time, processing in step S10 is selected. In step S10, maintenance of the target air-fuel ratio as is, that is, maintenance of the target air-fuel ratio at the lean air-fuel ratio is selected. By this selection, the lean operation is also continued in the current control cycle.

On the other hand, if the target torque is higher than the limit torque, that is, if the target torque cannot be realized at the lean air-fuel ratio even after the certain time, processing in step S8 is selected. In step S8, changing of the target air-fuel ratio to the theoretical air-fuel ratio is selected. By this selection, the operation of the engine 2 in the current control cycle is switched from the lean operation to a stoichiometric operation.

In the case where the determination in step S6 is selected as the next processing of step S2, a specified hysteresis is given to the limit torque. It is determined in step S6 whether the target torque is at most equal to a value that is lower than the limit torque, which is computed by the limit torque computation unit 102, by a hysteresis "α". If the target torque is higher than the limit torque, to which the hysteresis is given, the processing in step S10 is selected. In step S10, the maintenance of the target air-fuel ratio as is, that is, the maintenance of the target air-fuel ratio at the theoretical air-fuel ratio is selected. By this selection, the stoichiometric operation is also continued in the current control cycle.

On the other hand, if the target torque is at most equal to the limit torque, to which the hysteresis is given, processing in step S12 is selected. In step S12, changing of the target air-fuel ratio to the lean air-fuel ratio is selected. The hysteresis is provided to suppress frequent reversing of a magnitude relationship between the target torque and the limit torque and hunting during switching among the settings of the target air-fuel ratio, which is generated by the frequent reversing. Due to the change of the target air-fuel ratio to the lean air-fuel ratio, the operation of the engine 2 is switched from the stoichiometric operation to the lean operation in the current control cycle.

Referring again to FIG. 2, a function of the actuator operation amount computation unit 106 will be described next. The actuator operation amount computation unit 106 computes an operation amount of each of the actuators that is required to realize the target torque at the target air-fuel ratio set by the target air-fuel ratio setting unit 104. The actuators described here include the throttle 40 and the waste gate valve 46. The actuator operation amount computation unit 106 computes target intake manifold pressure from the target air-fuel ratio and the target torque and determines the opening degree of the throttle 40 and an opening degree of the waste gate valve 46 (diaphragm negative pressure of the negative pressure actuator 46*a* of the diaphragm type) from the target intake manifold pressure. More specifically, in the case where the target intake manifold pressure is at most equal to the turbocharging pressure, the waste gate valve 46 is fixed to be fully opened, and the throttle 40 is opened in correspondence with an increase in the target intake manifold pressure. In addition, in the case where the target intake manifold pressure becomes higher than the turbocharging pressure, the throttle 40 is fixed to be fully opened, and the waste gate valve 46 is closed in correspondence with an increase in the target intake manifold pressure.

The actuators, the operation amounts of which are computed by the actuator operation amount computation unit 106, include not only the throttle 40 and the waste gate valve 46 but also include all of the actuators related to torque control. More specifically, the port injection valve 20, the in-cylinder injection valve 22, the igniter including the ignition plug 18, the variable intake valve train 24, and the like are included therein. The actuator operation amount computation unit 106 determines the operation amounts of these actuators by referring to a map (a map with the target torque and the target air-fuel ratio as parameters) that is stored in the ROM, and outputs the operation amount as an instruction value to each of the actuators.

3. An operation realized by the controller Next, an operation that is realized by the controller 100 of Embodiment 1 will be described by using a time chart in addition to a comparative example thereof. In the comparative example, a method for determining the target air-fuel ratio from the target torque and the engine speed by referring to a map that is conformed in a normal state is adopted.

Figure 4:
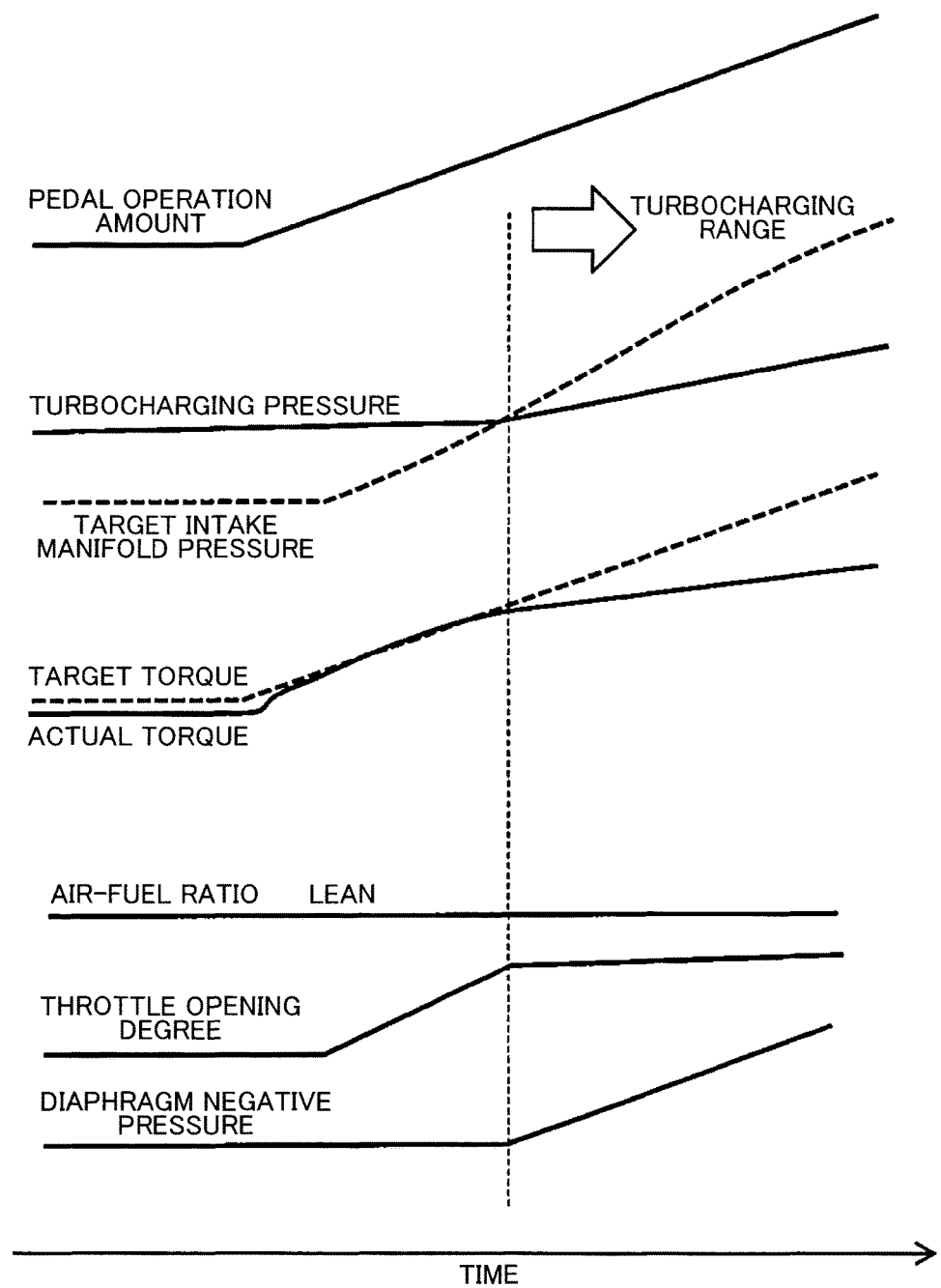
FIG. 4 is a time chart of an operation in a comparative example with respect to the controller in Embodiment 1 of the invention.

3-1 An operation in the comparative example FIG. 4 is a time chart of an operation in the comparative example with respect to the controller 100. The time chart in FIG. 4 shows a temporal change in each of the accelerator pedal operation amount, the turbocharging pressure, the target intake manifold pressure, the target torque, the actual torque, the air-fuel ratio (the target air-fuel ratio), the opening degree of the throttle 40, and the diaphragm negative pressure of the waste gate valve 46 in the case of a transition from a normal travel to an accelerated travel by the lean operation.

As shown in the time chart, during acceleration, the target torque is monotonically increased along with the accelerator pedal operation amount, and the target intake manifold pressure is also monotonically increased along with the target torque. The throttle opening degree is increased along with the target intake manifold pressure until the target intake manifold pressure reaches the turbocharging pressure, that is, until an operation range of the engine 2 falls within a turbocharging range, and the torque is controlled by the throttle opening degree. In the meantime, the diaphragm negative pressure that determines the opening degree of the waste gate valve 46 is fixed to a minimum value.

Eventually, the throttle opening degree becomes full opening, and the target intake manifold pressure reaches the turbocharging pressure. When the operation range of the engine 2 falls within the turbocharging range, the throttle opening degree is fixed to the full opening. In the turbocharging range, the diaphragm negative pressure is increased along with the target intake manifold pressure, and the torque is controlled by the opening degree of the waste gate valve 46.

However, since exhaust energy that is obtained in the lean operation is not high, the turbocharging pressure is not rapidly increased despite a fact that the diaphragm negative pressure is increased. As a result, the actual torque cannot be increased in a manner to follow the target torque, and a shortage of the actual torque with respect to the target torque becomes further significant as the target torque is increased.

Accordingly, the method in the comparative example cannot provide a desired sense of acceleration to the driver.

Figure 5:
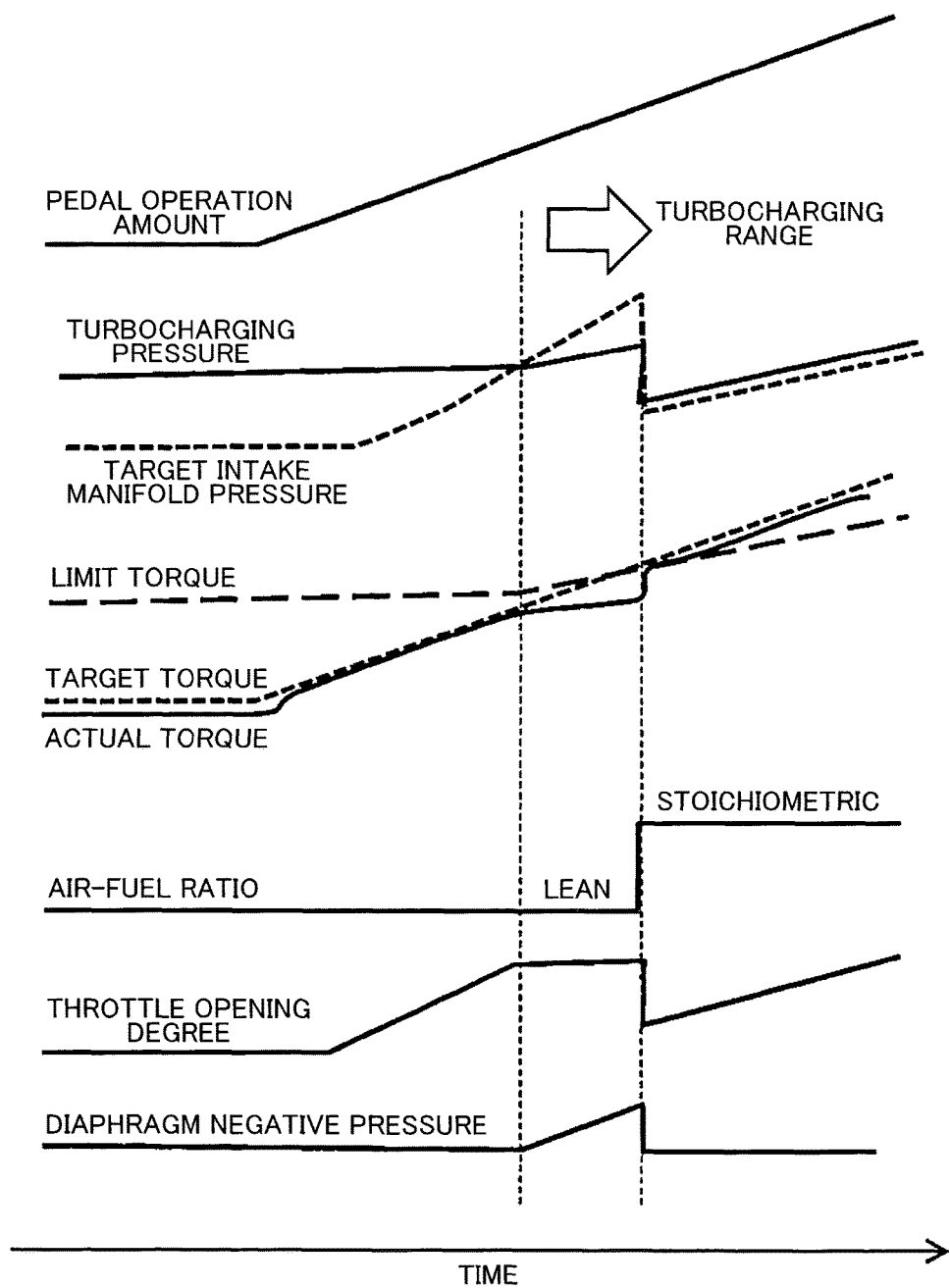
FIG. 5 is a time chart of an operation that is realized by the controller in Embodiment 1 of the invention.

3-2. Operation 1 realized by the controller FIG. 5 is a time chart of an operation that is realized by the controller 100. The time chart in FIG. 5 shows the temporal change in each of the accelerator pedal operation amount, the turbocharging pressure, the target intake manifold pressure, the limit torque, the target torque, the actual torque, the air-fuel ratio (the target air-fuel ratio), the opening degree of the throttle 40, and the diaphragm negative pressure of the waste gate valve 46 in the case of the transition from the normal travel to the accelerated travel by the lean operation.

As shown in the time chart, the operation that is until the target intake manifold pressure reaches the turbocharging pressure and the operation range of the engine 2 falls within the turbocharging range is substantially the same as the operation in the comparative example. However, the limit torque is constantly computed by the controller 100. The limit torque is the torque that is realized after the certain time when the throttle 40 is fully opened and the waste gate valve 46 is fully closed. In the time chart, a value of the limit torque is not significantly changed until the operation range of the engine 2 falls within the turbocharging range. This is because there is a delay in response of the increase in the intake air amount to the full opening of the throttle 40 and thus a significant portion of the above certain time overlaps this delayed time in response.

When the throttle 40 is fully opened and the operation range of the engine 2 falls within the turbocharging range, the limit torque is increased in correspondence with the increase in the turbocharging pressure. However, since the exhaust energy that is obtained in the lean operation is not high, an increasing speed of the turbocharging pressure is low, and the limit torque is increased at a speed corresponding thereto. Accordingly, in the case where an increasing speed of the target torque is higher than the increasing speed of the limit torque, the target torque eventually becomes higher than the limit torque. An operation to increase the actual torque by increasing the intake air amount while maintaining the lean air-fuel ratio (this refers to a first torque increasing operation) is executed until the target torque becomes higher than the limit torque. In the first torque increasing operation, the waste gate valve 46 is fixed to be fully opened, and the intake air amount is increased by the operation of the throttle 40. Then, once the throttle 40 is fully opened, the throttle 40 is fixed to be fully opened, and the intake air amount is increased by the operation of the waste gate valve 46.

When the target torque becomes higher than the limit torque, the target air-fuel ratio is switched from the lean air-fuel ratio to the theoretical air-fuel ratio, and an operation to increase the actual torque by the stoichiometric operation (this refers to a second torque increasing operation) is executed. In the second torque increasing operation, the waste gate valve 46 is opened at the same time as switching of the target air-fuel ratio, and the opening degree of the throttle 40 is once decreased. After the intake air amount is rapidly decreased once by this operation, the opening degree of the throttle 40 is increased along with the target torque, and the intake air amount is thereby increased.

The air-fuel ratio is set to be stoichiometric by switching from the first torque increasing operation to the second torque increasing operation, and the shortage of the actual torque with respect to the target torque is cancelled by the torque increase that is achieved thereby. Furthermore, since responsiveness of the turbocharging pressure is improved due to the increase in the exhaust energy, following performance of the actual torque with respect to the target torque within the turbocharging range is improved. In this way, the desired sense of acceleration can be provided to the driver.

Figure 6:
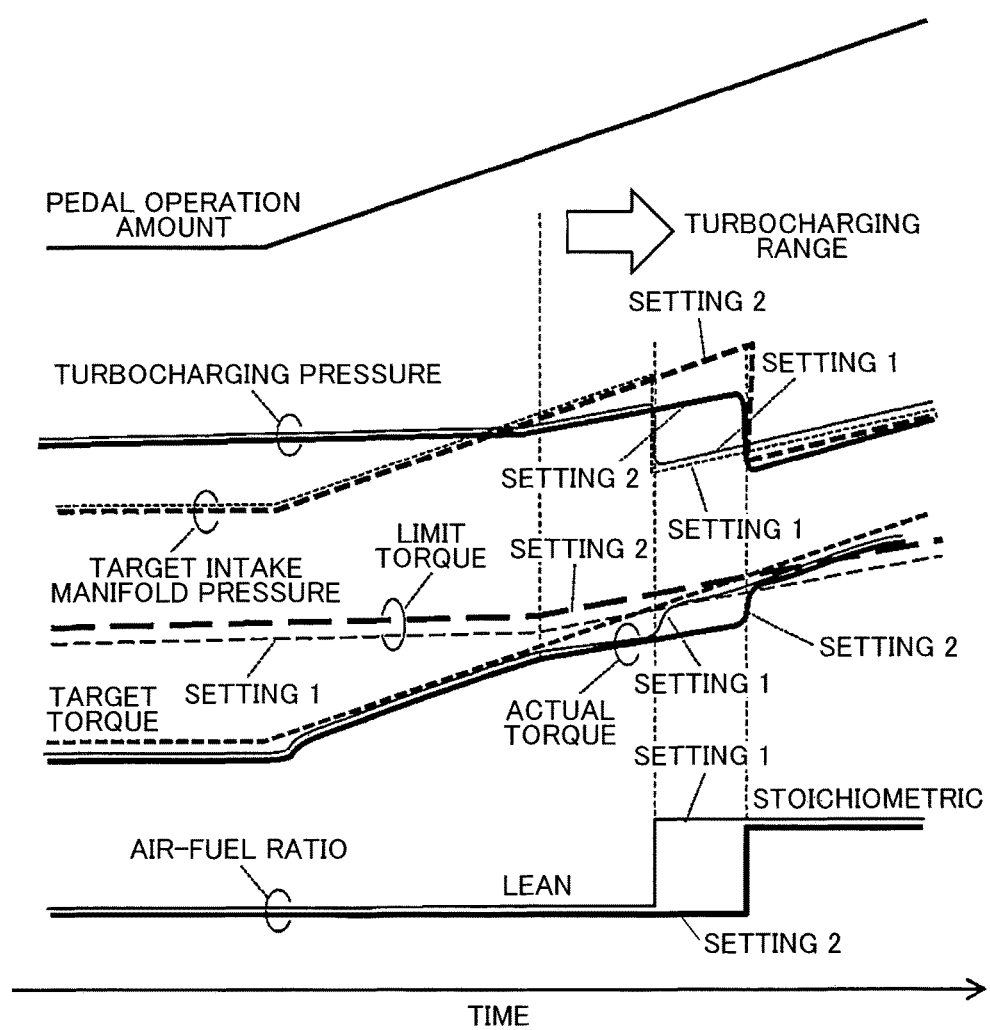
FIG. 6 is a time chart of the operation that is realized by the controller in Embodiment 1 of the invention.

3-3 Operation 2 realized by the controller FIG. 6 is a time chart in which the operation realized by the controller 100 is compared between a case where the read-ahead time is long and a case where the read-ahead time is short. The time chart shows the temporal change in each of the accelerator pedal operation amount, the turbocharging pressure, the target intake manifold pressure, the limit torque, the target torque, the actual torque, and the air-fuel ratio (the target air-fuel ratio) in the case of the transition from the normal travel to the accelerated travel by the lean operation. In the time chart, the operation in the case where the read-ahead time is set to be a short time (setting 1) is illustrated by thin lines, and the operation in the case where the read-ahead time is set to be a long time (setting 2) is illustrated by bold lines. In the time chart, items denoted with the setting 1 indicate the operation in the case where the read-ahead time is set to the setting 1, and items denoted with the setting 2 indicate the operation in the case where the read-ahead time is set to the setting 2.

As shown in the time chart, the limit torque is higher in the setting 2 than in the setting 1, and the target torque exceeds the limit torque at timing in the setting 2 that is later than timing in the setting 1. As a result, switching timing from the first torque increasing operation for increasing the torque of the engine 2 by the lean operation to the second torque increasing operation for increasing the torque of the engine 2 by the stoichiometric operation is delayed. That is, when the read-ahead time is set to be long, a period in which the lean operation is executed is extended. When the read-ahead time is set to be short, switching to the stoichiometric operation is made sooner.

As described above, the read-ahead time is associated with the operation mode selected by the driver (for example, the economy mode). When the operation mode, in which fuel economy performance is requested, is selected, the read-ahead time is set to the setting 2. In this way, the lean operation can be continued for a longer period, and thus the fuel economy performance is improved. Meanwhile, when the operation mode, in which acceleration performance is requested, (for example, the sport mode) is selected, the read-ahead time is set to the setting 1. In this way, the switching timing to the stoichiometric operation can be advanced, and thus the responsiveness of the torque is improved. Needless to say, the settings of the read-ahead time are not limited to two of the setting 1 and the setting 2. The read-ahead time that is in an intermediate time length between the setting 1 and the setting 2 may be set. Alternatively, the read-ahead time may be set in stepwise or may be set in a continuously variable manner.

Embodiment 2 1. Overview In Embodiment 2, Embodiment 1 is further improved. In Embodiment 1, the target air-fuel ratio is set by following the rule shown in the flowchart in FIG. 3. As it has already been described, in Embodiment 1, the limit torque and the target torque are compared in the determination related to the switching from the lean operation to the stoichiometric operation. Meanwhile, in the determination related to the switching from the stoichiometric operation to the lean operation, the value that is obtained by subtracting the hysteresis from the limit torque and the target torque are compared. The hysteresis is provided to prevent the hunting that is generated by the repeated reversing of the magnitude relationship between the target torque and the limit torque.

However, setting of the hysteresis also causes a delay in switching from the stoichiometric operation to the lean operation. In order not to reduce an opportunity for the improved fuel economy by the lean operation, it is not preferred to set a large hysteresis. Accordingly, in Embodiment 2, in order to prevent setting of the large hysteresis, a special control measure is taken against a particular situation where the magnitude relationship between the target torque and the limit torque is frequently reversed.

Figure 7:
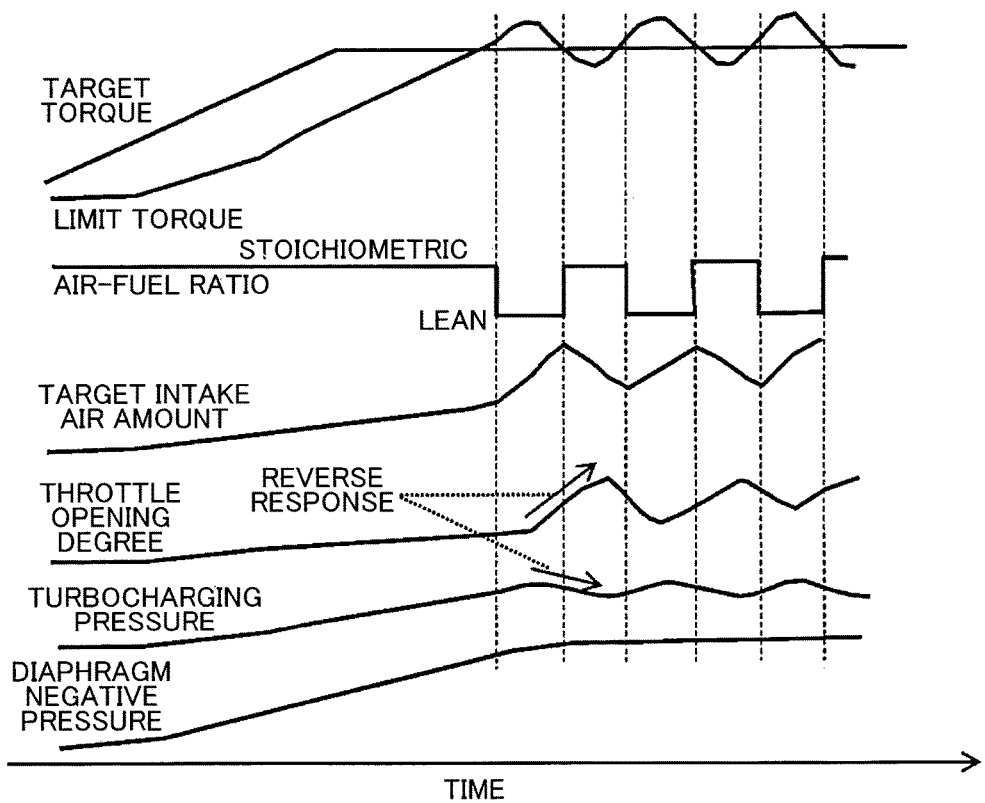
FIG. 7 is a time chart for illustrating an issue related to a determination on switching of the target air-fuel ratio.

FIG. 7 is a time chart for illustrating an issue related to the determination on switching of the target air-fuel ratio in the above particular situation. The time chart shows the temporal change in each of the target torque, the limit torque, the air-fuel ratio (the target air-fuel ratio), a target intake air amount, the opening degree of the throttle 40, the turbocharging pressure, and the diaphragm negative pressure of the waste gate valve 46 in the case where turbocharging pressure reserve control is executed during the accelerated travel by the stoichiometric operation. The turbocharging pressure reserve control means control for improving responsiveness of the intake air amount with respect to an opening operation of the throttle 40 by closing the waste gate valve 46 to increase the turbocharging pressure in advance before the throttle 40 is fully opened.

In an example shown in the time chart, the limit torque is gradually increased along with the increase in the turbocharging pressure. Eventually, after the accelerated travel is shifted to a constant speed travel and thus the increase in the target torque is stopped, the limit torque and the target torque are reversed. Although not illustrated in the time chart, the hysteresis is set for the limit torque. When a value that is lower than the limit torque by the hysteresis becomes at least equal to the target torque, the target air-fuel ratio is switched from the theoretical air-fuel ratio to the lean air-fuel ratio by following the above-described setting rule of the target air-fuel ratio (the rule shown in the flowchart in FIG. 3).

The target intake air amount is increased in correspondence with setting of the target air-fuel ratio to be lean. Then, the opening degree of the throttle 40 is increased so as to realize the increased target intake air amount. When the throttle 40 is opened and thus a flow rate of the air that pasks through the throttle 40 is increased, the turbocharging pressure, which is the pressure on the upstream side of the throttle 40, is temporarily decreased. That is, reverse response of the turbocharging pressure with respect to an operation of the throttle 40 occurs. When the turbocharging pressure is decreased by this reverse response, the limit torque that is computed on the basis of the current turbocharging pressure is also decreased. Thus, the limit torque becomes lower than the target torque again.

When the limit torque becomes lower than the target torque, the target air-fuel ratio is switched from the lean air-fuel ratio to the theoretical air-fuel ratio by following the above-described setting rule of the target air-fuel ratio. The target intake air amount is decreased in correspondence with setting of the target air-fuel ratio to be stoichiometric. Then, the opening degree of the throttle 40 is decreased so as to realize the decreased target intake air amount. The turbocharging pressure is then temporarily increased due to the reverse response with respect to the operation of the throttle 40, and the limit torque is increased again to be higher than the target torque.

The above-described particular situation refers to a situation where the magnitude relationship between the target torque and the limit torque is repeatedly reversed by the reverse response of the turbocharging pressure with respect to the operation of the throttle 40 as described above. In order to prevent the hunting in such a situation, it is effective not to switch the target air-fuel ratio again until the reverse response of the turbocharging pressure with respect to the operation of the throttle 40 is concluded after the initial switching of the target air-fuel ratio.

Figure 8:
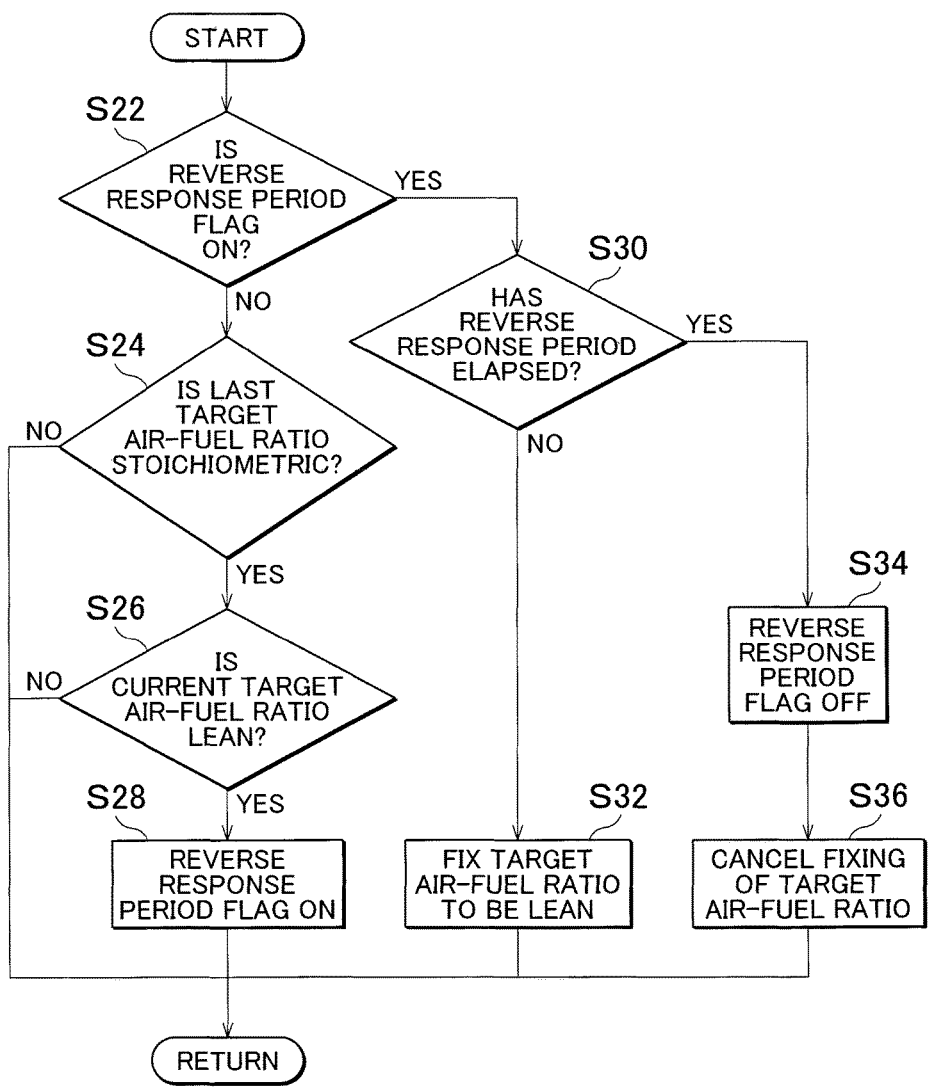
FIG. 8 is a flowchart of an overview of response to reverse response of turbocharging pressure adopted in Embodiment 2 of the invention.

FIG. 8 is a flowchart of an overview of a measure against the reverse response of the turbocharging pressure that is taken in this embodiment. The controller 100 takes the measure against the reverse response of the turbocharging pressure by following this flowchart at every control cycle. First, it is determined in step S22 whether a flag (a reverse response period flag) indicating that current time is in a reverse response period of the turbocharging pressure is ON.

If the reverse response period flag is OFF, a determination in step S24 is made. It is determined in step S24 whether the target air-fuel ratio in the last control cycle is the theoretical air-fuel ratio. If the target air-fuel ratio in the last control cycle is the theoretical air-fuel ratio, a determination in step S26 is made next. It is determined in step S26 whether the target air-fuel ratio in the current control cycle is the lean air-fuel ratio. If the target air-fuel ratio in the last control cycle is the lean air-fuel ratio, or if the target air-fuel ratio in the current control cycle is the theoretical air-fuel ratio, the measure against the reverse response of the turbocharging pressure is not taken. In this case, the target air-fuel ratio is set by following the above-described rule (the rule shown in the flowchart in FIG. 3).

If the target air-fuel ratio in the last control cycle is the theoretical air-fuel ratio and the target air-fuel ratio in the current control cycle is the lean air-fuel ratio, processing in step S28 is executed. In step S28, the reverse response period flag is switched from OFF to ON.

Since the reverse response period flag is ON, a determination result in step S22 is positive in the next control cycle. In this case, processing in step S30 is executed. It is determined in step S30 whether the reverse response period has elapsed. The reverse response period can be defined as, for example, a period from a time point at which the target air-fuel ratio is switched from the theoretical air-fuel ratio to the lean air-fuel ratio as a starting point to a time point at which the target intake air amount is converged to the estimated intake air amount as an end point.

If the reverse response period has not elapsed, processing in step S32 is executed. In step S32, the target air-fuel ratio is fixed to the lean air-fuel ratio.

If the reverse response period has elapsed, processing in step S34 and processing in step S36 are executed. In step S34, the reverse response period flag is switched from ON to OFF. Then, in step S36, fixing of the target air-fuel ratio to the lean air-fuel ratio is cancelled.

By taking the control measure as described above against the reverse response of the turbocharging pressure, it is possible to prevent the hunting, which is generated by repeated reversing of the magnitude relationship between the target torque and the limit torque.

Figure 9:
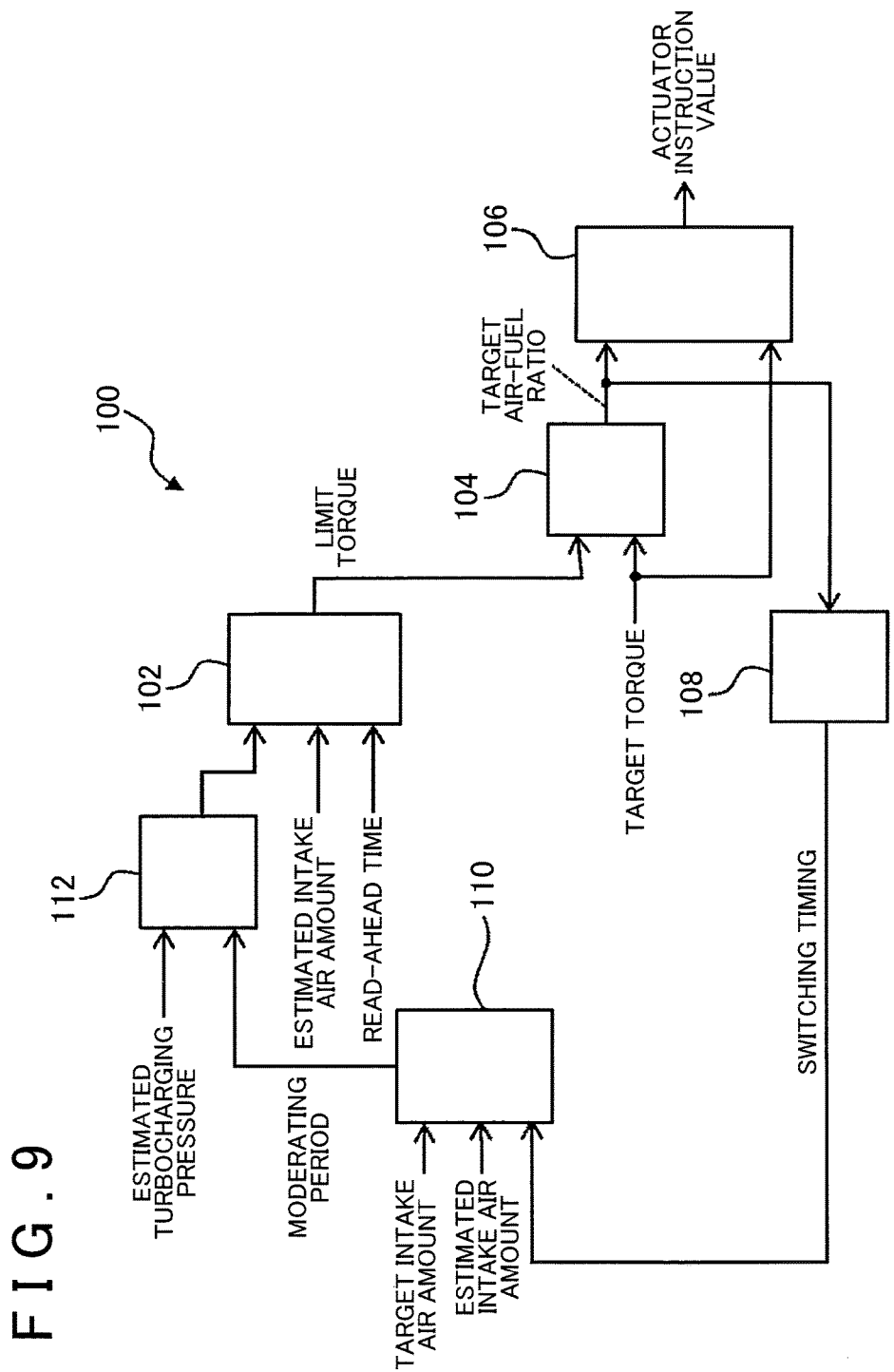
FIG. 9 is a block diagram of a configuration of a controller in Embodiment 2 of the invention.

2. A configuration of the controller In order to take the measure against the reverse response of the turbocharging pressure as described above, the controller 100 of Embodiment 2 is configured as shown in FIG. 9. The controller 100 of Embodiment 2 includes a switching timing detection unit 108, a moderating period computation unit 110, and an estimated turbocharging pressure modification unit 112, in addition to the limit torque computation unit 102, the target air-fuel ratio setting unit 104, and the actuator operation amount computation unit 106. These computation units provided in the controller 100 correspond to the control program or a portion thereof that is stored in the ROM of the controller 100. Functions of these computation units are realized by the controller 100 when the control program is read out from the ROM and is executed by the CPU.

The switching timing detection unit 108 receives output of the target air-fuel ratio setting unit 104 and detects timing at which the target air-fuel ratio is switched from the theoretical air-fuel ratio to the lean air-fuel ratio. When detecting the switching timing, the switching timing detection unit 108 switches the flag from OFF to ON.

The moderating period computation unit 110 computes a moderating period that is a period in which moderating processing is executed on the estimated turbocharging pressure. The moderating period is set to be equal to or slightly longer than the reverse response period of the turbocharging pressure. The moderating period computation unit 110 initiates the moderating period from a time point at which the flag is switched to ON in the switching timing detection unit 108. Then, the moderating period continues until it can be determined that the estimated intake air amount is converged to the target intake air amount, for example, until a difference between the target intake air amount and the estimated intake air amount becomes at most equal to a threshold.

The estimated turbocharging pressure modification unit 112 performs the moderating processing on the estimated turbocharging pressure while the moderating period is set by the moderating period computation unit 110. The moderating processing may be processing that can suppress amplitudes of periodic fluctuations and a rapid change in the estimated turbocharging pressure. As an example of the moderating processing, smoothing process, such as processing by a low pass filter or processing by a moving average filter, can be raised.

The limit torque computation unit 102 receives the estimated turbocharging pressure that has been processed by the estimated turbocharging pressure modification unit 112. In the case where the moderating processing is performed on the estimated turbocharging pressure, amplitudes of periodic fluctuations and a rapid change in the limit torque, which is computed on the basis of the estimated turbocharging pressure, are also suppressed. The limit torque that is computed by the limit torque computation unit 102 is input to the target air-fuel ratio setting unit 104. The target air-fuel ratio setting unit 104 sets the target air-fuel ratio by following the rule that is shown in the flowchart in FIG. 3.

Figure 10:
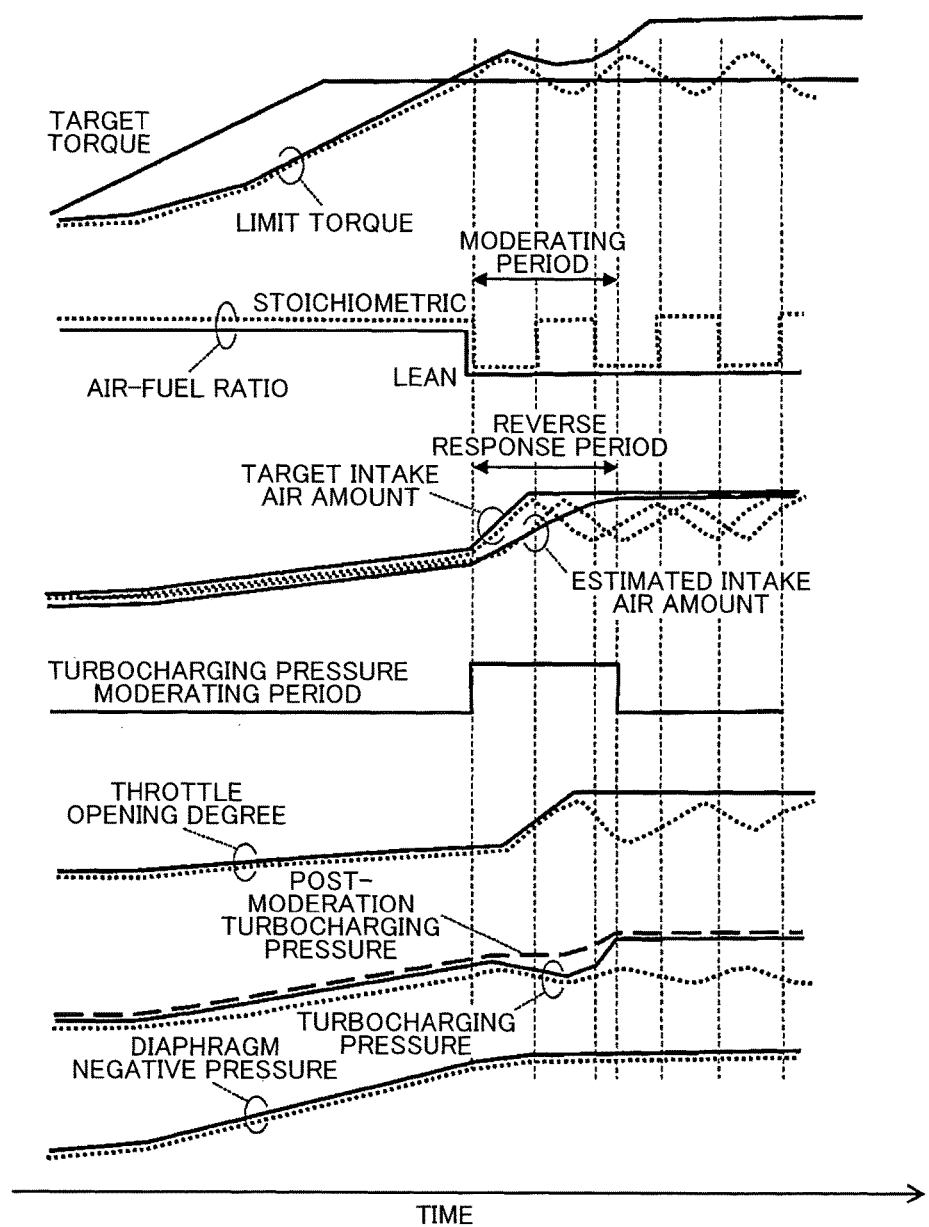
FIG. 10 is a time chart of an operation that is realized by the controller in Embodiment 2 of the invention.

3. An operation realized by the controller FIG. 10 is a time chart of an operation that is realized by the controller 100 in Embodiment 2. The time chart in FIG. 10 shows the temporal change in each of the target torque, the limit torque, the air-fuel ratio (the target air-fuel ratio), the target intake air amount, the estimated intake air amount, the moderating period of the turbocharging pressure, the opening degree of the throttle 40, the turbocharging pressure, post-moderation turbocharging pressure, and the diaphragm negative pressure of the waste gate valve 46 in the case where the turbocharging pressure reserve control is executed during the accelerated travel by the stoichiometric operation. It should be noted that operations illustrated by solid lines in the time chart are operations that are realized by the controller 100 in Embodiment 2 and that operations illustrated by dotted lines are operations in the case where the control measure against the reverse response of the turbocharging pressure is not taken.

In an example shown in the time chart, even after the target torque becomes constant due to the transition from the accelerated travel to the constant speed travel, the limit torque keeps increasing due to the increase in the turbocharging pressure by the turbocharging pressure reserve control. Eventually, the limit torque becomes higher than the target torque, and at this time, the target air-fuel ratio is switched from the theoretical air-fuel ratio to the lean air-fuel ratio. In addition, at the same time as the above, the moderating period of the turbocharging pressure is set, and the moderating processing of the turbocharging pressure that is used for the computation of the limit torque is executed.

Since the limit torque is computed on the basis of the turbocharging pressure after the moderating processing during the moderating period, a waveform of the limit torque becomes a waveform in which the amplitudes of the periodic fluctuations are suppressed. As a result, the limit torque no longer falls below the target torque, and thus the switching of the target air-fuel ratio from the lean air-fuel ratio to the theoretical air-fuel ratio is prevented. The moderating processing on the turbocharging pressure is cancelled after the moderating period. However, the fluctuations in the turbocharging pressure have already been converged in this stage. Thus, the magnitude relationship between the target torque and the limit torque is no longer reversed. In this way, deterioration of drivability and deterioration of the fuel economy, which are caused by switching of the air-fuel ratio more than necessary, can be avoided.

Figure 11:
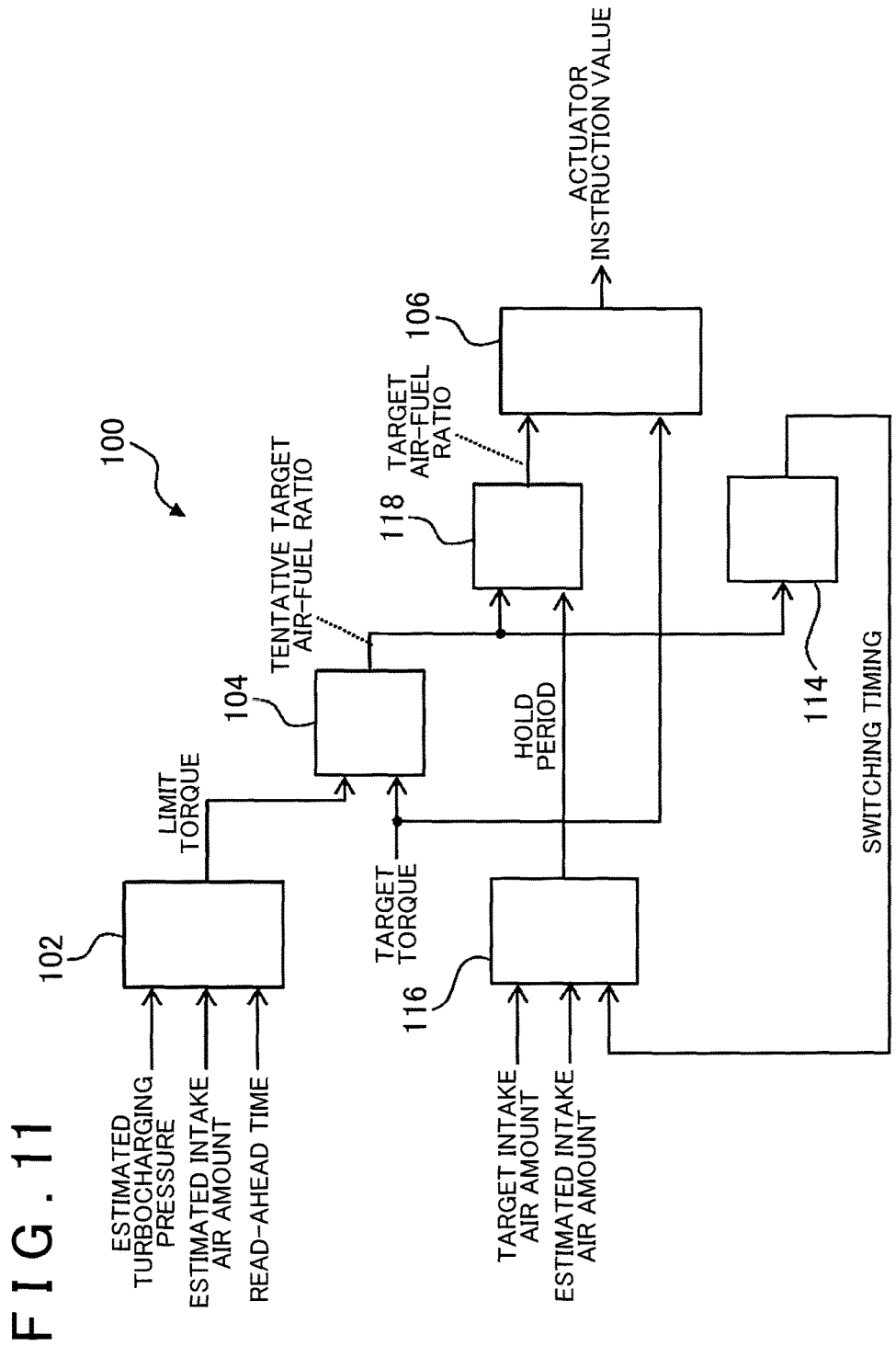
FIG. 11 is a block diagram of a configuration of a controller in Embodiment 3 of the invention.

Embodiment 3 1. A configuration of the controller FIG. 11 is a block diagram of a configuration of the controller 100 in Embodiment 3. Similar to Embodiment 2, the controller 100 of Embodiment 3 has a configuration for which the control measure against the reverse response of the turbocharging pressure is taken. The controller 100 of Embodiment 3 includes a switching timing detection unit 114, a hold period computation unit 116, and a target air-fuel ratio confirmation unit 118, in addition to the limit torque computation unit 102, the target air-fuel ratio setting unit 104, and the actuator operation amount computation unit 106. These computation units provided in the controller 100 correspond to the control program or a portion thereof that is stored in the ROM of the controller 100. Functions of these computation units are realized by the controller 100 when the control program is read out from the ROM and is executed by the CPU.

The switching timing detection unit 114 receives the output of the target air-fuel ratio setting unit 104 and detects the timing at which the target air-fuel ratio is switched from the theoretical air-fuel ratio to the lean air-fuel ratio. When detecting the switching timing, the switching timing detection unit 114 switches the flag from OFF to ON.

The hold period computation unit 116 computes a hold period that is a period for holding the target air-fuel ratio. The hold period is set to be equal to or slightly longer than the reverse response period of the turbocharging pressure. The hold period computation unit 116 initiates the hold period from a time point at which the flag is switched to ON in the switching timing detection unit 114. Then, the hold period continues until it can be determined that the estimated intake air amount is converged to the target intake air amount, for example, until the difference between the target intake air amount and the estimated intake air amount becomes at most equal to the threshold.

The target air-fuel ratio confirmation unit 118 receives the target air-fuel ratio that is set by the target air-fuel ratio setting unit 104 as a tentative target air-fuel ratio. The target air-fuel ratio setting unit 104 sets the target air-fuel ratio by following the rule that is shown in the flowchart in FIG. 3. When the hold period is set by the hold period computation unit 116, the target air-fuel ratio confirmation unit 118 holds the tentative target air-fuel ratio at the time, that is, the lean air-fuel ratio. Then, the target air-fuel ratio confirmation unit 118 outputs the holding tentative target air-fuel ratio as a confirmed value of the target air-fuel ratio to the actuator operation amount computation unit 106 while the hold period is set.

Figure 12:
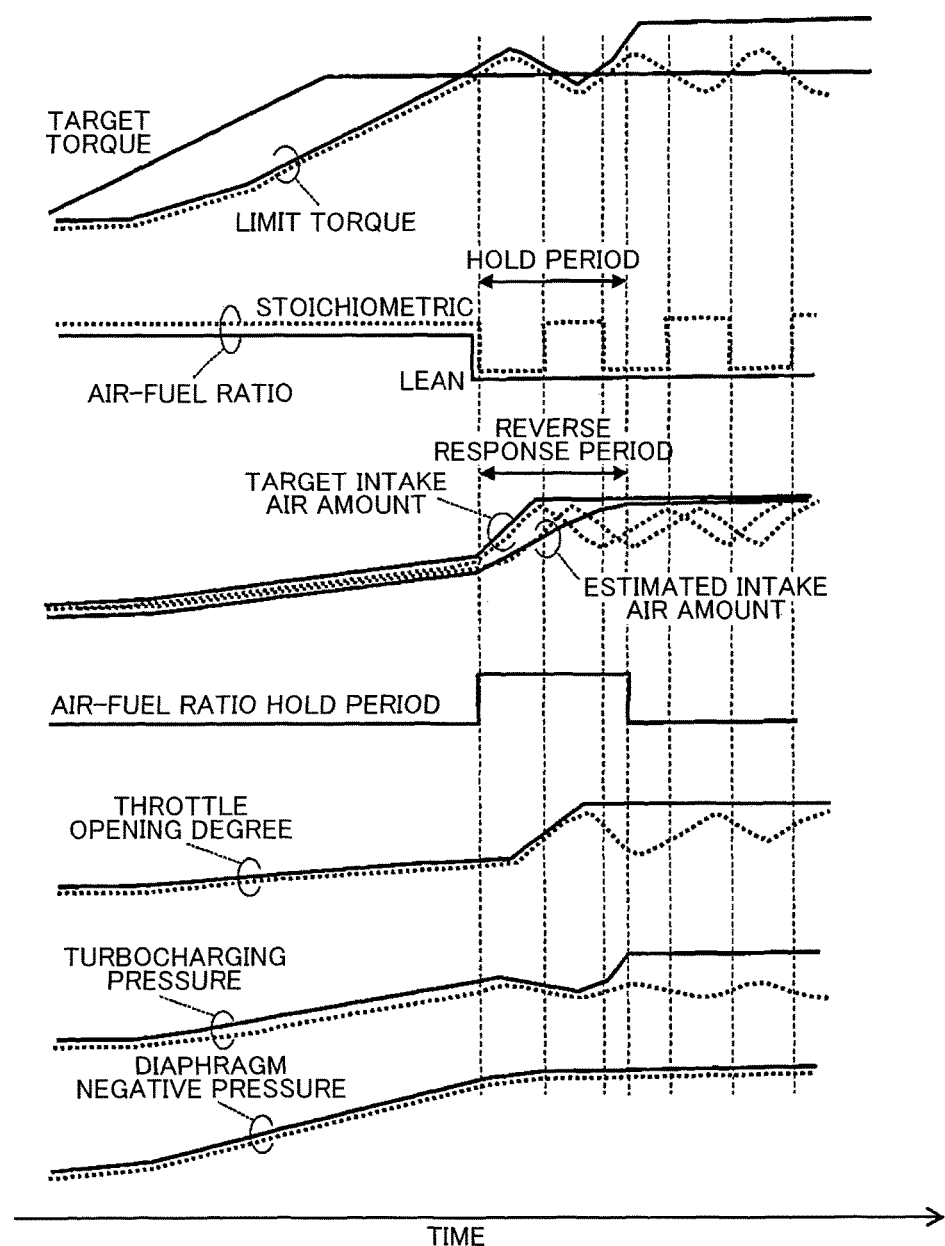
FIG. 12 is a time chart of an operation that is realized by the controller in Embodiment 3 of the invention.

2. An operation realized by the controller FIG. 12 is a time chart of an operation that is realized by the controller 100 in Embodiment 3. The time chart in FIG. 12 shows the temporal change in each of the target torque, the limit torque, the air-fuel ratio (the target air-fuel ratio), the target intake air amount, the estimated intake air amount, the moderating period of the turbocharging pressure, the opening degree of the throttle 40, the turbocharging pressure, the post-moderation turbocharging pressure, and the diaphragm negative pressure of the waste gate valve 46 in the case where the turbocharging pressure reserve control is executed during the accelerated travel by the stoichiometric operation. It should be noted that operations illustrated by solid lines in the time chart are operations that are realized by the controller 100 in Embodiment 3 and that operations illustrated by dotted lines are operations in the case where the control measure against the reverse response of the turbocharging pressure is not taken.

In an example shown in the time chart, even after the target torque becomes constant due to the transition from the accelerated travel to the constant speed travel, the limit torque keeps increasing due to the increase in the turbocharging pressure by the turbocharging pressure reserve control. Eventually, the limit torque becomes higher than the target torque, and at this time, the target air-fuel ratio is switched from the theoretical air-fuel ratio to the lean air-fuel ratio. In addition, at the same time as the above, the hold period of the target air-fuel ratio is set, and the target air-fuel ratio is held at the lean air-fuel ratio.

During the hold period, even when the magnitude relationship between the target torque and the limit torque is reversed, the target air-fuel ratio is held at the lean air-fuel ratio regardless of the reversing. The holding of the target air-fuel ratio at the lean air-fuel ratio is cancelled after the hold period. However, the fluctuations in the turbocharging pressure have already been converged in this stage. Thus, the magnitude relationship between the target torque and the limit torque is no longer reversed. In this way, the deterioration of drivability and the deterioration of the fuel economy, which are caused by switching of the air-fuel ratio more than necessary, can be avoided.

What is claimed is:

1. A controller for an internal combustion engine, the internal combustion engine including a turbocharger, the internal combustion engine configured to selectively switch between an operation at a theoretical air-fuel ratio and an operation at a specified lean air-fuel ratio that is leaner than the theoretical air-fuel ratio, the controller comprising:
an electronic control unit configured to increase an air amount that is suctioned into a cylinder of the internal combustion engine while maintaining the lean air-fuel ratio as a first torque increasing operation in a case where target torque is increased during the operation at the lean air-fuel ratio such that torque of the internal combustion engine is increased, the electronic control unit configured to compute limit torque as an upper limit of the torque that can be realized in a case where the lean air-fuel ratio is kept for a certain time from a current time point, the electronic control unit configured to switch to the operation at the theoretical air-fuel ratio and increase the torque of the internal combustion engine as a second torque increasing operation in a case where the target torque becomes higher than the limit torque during execution of the first torque increasing operation, wherein the electronic control unit is configured to calculate the certain time as a window time until realization of the target torque with which an acceleration request by a driver can be satisfied.

2. The controller for an internal combustion engine according to claim 1, wherein the internal combustion engine includes: a throttle provided in an intake passage; and a waste gate valve provided in an exhaust passage, and the electronic control unit is configured to compute the limit torque as torque that is realized after the certain time in a case where the throttle is fully opened and the waste gate valve is fully closed at the current time point.

3. The controller for an internal combustion engine according to claim 1, wherein the electronic control unit is configured to change a length of the certain time in accordance with an operation mode selected by a driver.

4. The controller for an internal combustion engine according to claim 1, wherein the electronic control unit is configured to switch from the operation at the theoretical air-fuel ratio to the operation at the lean air-fuel ratio and maintain the operation at the lean air-fuel ratio for a specified period after switching to the lean air-fuel ratio in a case where the limit torque becomes higher than the target torque during the execution of the second torque increasing operation.

* * * * *